United States Patent Office 2,701,253
Patented Feb. 1, 1955

2,701,253
SUBSTITUTED DITHIOLANES

Robert H. Jones and George E. Lukes, Irvington, and Joseph T. Bashour, New York, N. Y., assignors to Stauffer Chemical Company, a corporation of Delaware No Drawing. Application April 1, 1953,
Serial No. 346,275

6 Claims. (Cl. 260—327)

This invention relates to certain novel compositions of matter.

More specifically, the invention relates to certain 1,3-dithiolanes. The dithiolanes of the present invention have the following general structural formula:

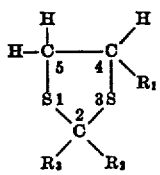

In the above formula, $R_1$ may be hydrogen or a lower alkyl group, $R_2$ may be hydrogen, a lower alkyl group, or an aryl group, and $R_3$ may be a substituted aryl radical wherein the substituent is chlorine, dioxymethylene, alkyl or a hydroxyl radical. Of these compounds, we prefer those wherein $R_3$ is a parachlorophenyl radical, and $R_1$ and $R_2$ represent hydrogen atoms or lower alkyl groups. We particularly prefer the compound wherein $R_3$ is a parachlorophenyl radical and $R_1$ and $R_2$ are hydrogen atoms.

In general, the compositions of this invention may be made by reacting a dimercaptan with a suitable aromatic aldehyde or ketone. The dimercaptan which is used will depend upon the substituent desired at $R_1$. For instance, if $R_1$ is to be hydrogen, ethylene dimercaptan is a suitable starting material. If one wishes to have $R_1$ a methyl radical, one would start with propylene-1,2-dimercaptan. Similarly, the aromatic aldehyde or ketone will depend upon the desired substituents at $R_2$ and $R_3$. Thus, if one wishes to have $R_2$ hydrogen and $R_3$ parachlorophenyl, parachlorobenzaldehyde would be a suitable starting material. If one wished that $R_2$ be a lower alkyl group such as a methyl radical and $R_3$ parachlorophenyl, one could start with methyl p-chlorophenyl ketone.

Instead of using the dimercaptans as described above, one may use a dimercaptide of an alkali metal and in place of the aldehyde or ketone, use the corresponding halogenated compound. Thus, one could use ethylene disodium dimercaptide and p-chlorobenzyldichloride to produce 2-p-chlorophenyl-1,3-dithiolane.

In the case of the dimercaptan starting material, the reaction goes smoothly in the presence of a small quantity of p-toluene sulfonic acid as a ctatalyst at the reflux temperature of the mixture. Acidic catalysts which do not react with the reactants may be used. Friedel-Crafts catalysts are particularly suitable. The water produced by the reaction may be removed by azeotropic distillation, as it is formed, in the case of the dimercaptan. The reaction can also be conducted at room temperature by saturating the reactants, in anhydrous conditions, with HCl gas.

The following non-limiting examples illustrate the preparation of some compounds falling within the scope of the present invention:

Example I.—2 - p - chlorophenyl - 1,3-dithiolane.—One mole of ethylene dimercaptan, one mole of p-chlorobenzaldehyde, 500 cc. of benzene and one gram of p-toluene sulfonic acid were refluxed in one liter flask equipped with a Dean Stark moisture trap. After four hours' refluxing, sixteen cc. of water had been collected in the moisture trap. The reaction mixture was cooled, water washed, stripped free of benzene and residue crystallized from ethanol. White needles, M. P. 62° C.; percent S (calc.)=29.5; percent S (found=29.3.

Example II.—2 - p-chlorophenyl - 4 - methyl-1,3-dithiolane.—About 0.25 mol. of propylene-1,2-dimercaptan, 0.25 mol. of p-chlorobenzaldehyde were dissolved in 200 cc. of benzene. Under anhydrous conditions, the solution was saturated with hydrogen chloride gas and allowed to stand overnight. Then the reaction mixture was water washed, dried with $CaCl_2$, stripped free of benzene and distilled. The fraction boiling at 168–170° C. at 3.5 mm. is the 2-p-chlorophenyl-4-methyl-1,3-dithiolane. Percent S (calc.)=27.6; percent S (found)=27.6.

Example III.—2 - p-chlorophenyl-2-ethyl-4-methyl-1,3-dithiolane.—One mole of propylene-1,2-dimercaptan and one mole of p-chloro propiophenone were dissolved in 300 cc. of benzene and 10 g. of anhydrous $ZnCl_2$ were added to the solution. The solution was then saturated with hydrogen chloride gas and allowed to stand overnight. Then the reaction mixture was washed with dilute hydrochloric acid and then water, dried with $CaCl_2$, stripped free of the solvent and distilled. The fraction boiling at 158–159° C. at 3.5 mm. is the 2-p-chlorophenyl -2-ethyl-4-methyl-1,3-dithiolane. Percent S (calc.)=24.7; percent S (found)=24.6.

Example IV.—2 - p-chlorophenyl-2-n-hexyl-1,3-dithiolane.—About 0.132 mole of ethylene dimercaptan and 0.132 mole of p-chlorophenyl-n-hexyl ketone were dissolved in 200 cc. of benzene. 5 grams of $ZnCl_2$ were added to the solution and the mixture was saturated with hydrogen chloride gas under anhydrous conditions. After standing overnight, the reaction mixture was washed with dilute hydrochloric acid, then water, dried with $CaCl_2$ and stripped free of the solvent and distilled. The fraction boiling at 172° C. at 0.7 mm. is the 2-p-chlorophenyl-2-n-hexyl-1,3-dithiolane.

Example V.—2 - p-chlorophenyl - 2 - ethyl - 1,3 - dithiolane.—One mole of ethylene dimercaptan, one mole of p-chloropropiophenone, 300 cc. of benzene and 10 grams of $ZnCl_2$ were placed in a reaction vessel. The mixture was then saturated with hydrogen chloride gas and allowed to stand overnight. The reaction mixture was then washed with dilute hydrochloric acid, followed by water, dried with $CaCl_2$, stripped free of benzene and distilled. The fraction boiling at 154° C. at 1.5 mm. is 2 - p - chlorophenyl - 2 - ethyl - 1,3 - dithiolane. Percent S (calc.)=26.1, percent S (found)=25.8.

Following procedures similar to those in the above examples, the following compounds have been made. After each compound is a brief description of its properties.

| Compound | M. P., ° C. | Percent S (calc.) | Percent S (Found) |
|---|---|---|---|
| 2-(2,4-dichlorophenyl)-1,3-dithiolane | 38 | 25.5 | 25.7 |
| 2-(3,4-dioxymethylenephenyl)-1,3-dithiolane | 48–49 | 28.3 | 28.3 |
| 2-p-chlorophenyl-2-phenyl-1-3-dithiolane | 44 | Cl 12.2% | Cl 12.2% |
| 2-p-hydroxyphenyl-1,3-dithiolane | 119–120 | 32.4 | 32.3 |

| | B. P., ° C. | | |
|---|---|---|---|
| 2-p-chlorophenyl-4-hydroxy methyl-1,3-dithiolane. | Non-distillable | | |
| 2-p-chlorophenyl-1,3-dithiolane | 150–151 at .5 mm | 29.2 | 29.7 |
| 2-p-tolyl-1,3-dithiolane | 198 at 24 mm | 32.6 | 33.3 |
| 2-(3,4 dioxymethylene-phenyl)-4-methyl-1, dithiolane | 165–169 at .8 mm | 26.2 | 27.3 |
| 2-p-chlorophenyl-2-n-hexyl-4-methyl-1,3-dithiolane. | 159 at .2 mm | 20.3 | |
| 2-p-chlorophenyl-2-methyl-1,3-dithiolane | 145 at 1 mm | 27.7 | 27.6 |

The compositions of the present invention may be used in various manners in the arts. One particularly important use of the compounds of the present invention have been tested and found effective against a number of common insects, including *M. domesticus, P. americana: O. fasciatus, T. confusum* and *A. fabae*. Further, the compounds of the present invention possess acaricidal, fungicidal and nematocidal activity. The compounds may also be used as ore flotation agents, lubricating oil additives and in the compounding of rubber.

We claim:

1. As a new composition of matter, a compound having the formula:

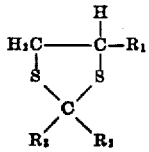

wherein $R_1$ is a member selected from the group consisting of the hydrogen atom and lower alkyl radicals; $R_2$ is a member selected from the group consisting of the hydrogen atom, lower alkyl radicals and the phenyl radical, and $R_3$ is a substituted phenyl radical wherein the substituent is selected from the group consisting of chlorine, dioxymethylene and hydroxy radicals.

2. As a new composition of matter, 2-p-chlorophenyl-1,3-dithiolane.

3. As a new composition of matter, 2-ethyl 2-p-chlorophenyl-1,3-dithiolane.

4. As a new composition of matter, 2-methyl-2-p-chlorophenyl-1,3-dithiolane.

5. As a new composition of matter, 2-p-chlorophenyl-4-methyl-1,3-dithiolane.

6. As a new composition of matter, 2-ethyl 2-p-chlorophenyl-4-methyl-1,3-dithiolane.

References Cited in the file of this patent

UNITED STATES PATENTS

Hackh: Chemical Dictionary (3rd ed.) (1944), pp. 412 and 110.
Reid et al.: J. Org. Chem. 15, 448–449 (1950).